(12) United States Patent
Zacche'

(10) Patent No.: US 8,657,598 B2
(45) Date of Patent: Feb. 25, 2014

(54) PRESSURE ADJUSTMENT DEVICE IN STRETCH BLOW MOULDING MACHINES

(75) Inventor: Vanni Zacche', Bergamo (IT)

(73) Assignee: SMI S.p.A., Bergamo (IT)

( * ) Notice: Subject to any disclaimer, the term of this patent is extended or adjusted under 35 U.S.C. 154(b) by 221 days.

(21) Appl. No.: 13/174,910

(22) Filed: Jul. 1, 2011

(65) Prior Publication Data

US 2012/0001370 A1 Jan. 5, 2012

(30) Foreign Application Priority Data

Jul. 2, 2010 (IT) ................ MI2010A1222

(51) Int. Cl.
*B29C 49/58* (2006.01)
*F16K 31/122* (2006.01)

(52) U.S. Cl.
USPC ............... 425/529; 251/63; 425/535

(58) Field of Classification Search
CPC .......... F16K 31/1221; F16K 31/1226
USPC ............... 425/529, 535; 251/62, 63
See application file for complete search history.

(56) References Cited

U.S. PATENT DOCUMENTS

| | | | |
|---|---|---|---|
| 3,075,556 A * | 1/1963 | Hutter et al. | 137/625.27 |
| 3,604,459 A * | 9/1971 | Rosaen | 137/625.6 |
| 3,633,608 A * | 1/1972 | Minkner et al. | 137/220 |
| 4,136,851 A * | 1/1979 | Hansen et al. | 251/63 |
| 4,490,327 A * | 12/1984 | Calvert et al. | 264/533 |
| 2007/0102048 A1* | 5/2007 | Bravo | 137/495 |

FOREIGN PATENT DOCUMENTS

| | | |
|---|---|---|
| DE | 10 2008 015 776 B3 | 7/2009 |
| EP | 1 574 771 A2 | 9/2005 |
| FR | 2928197 A1 * | 9/2009 |
| WO | WO 2009/010096 A1 | 1/2009 |
| WO | WO 2010/060565 A1 | 6/2010 |

OTHER PUBLICATIONS

Partial machine translation of WO 2009/010096 A1 dated Oct. 2008 obtained from the WIPO website.*

* cited by examiner

*Primary Examiner* — Robert B Davis
(74) *Attorney, Agent, or Firm* — Dickstein Shapiro LLP

(57) ABSTRACT

A pressure adjustment device applicable in particular, but not exclusively, to stretch blow molding machines. More particularly, the invention relates to a pressure adjustment device for stretch blow molding machines of containers made of plastic material. The device includes an opening for dispensing a blowing fluid, a hollow body having a first inlet opening for a high pressure fluid and a second inlet opening for a piloting fluid. A shutter is slidably arranged within the hollow body, the shutter being held in a closed position by elastic means, wherein the adjustable opening of the shutter occurs, in contrast with the elastic means, by introducing—through said second inlet opening—the piloting fluid into a piloting chamber arranged between the hollow body the shutter, and wherein the piloting fluid has a controlled and adjustable pressure.

16 Claims, 4 Drawing Sheets

PRESSURE ADJUSTMENT DEVICE IN STRETCH BLOW MOULDING MACHINES

FIELD OF THE INVENTION

The present invention refers to a pressure adjustment device applicable in particular, but not exclusively, to stretch blow moulding machines.

BACKGROUND ART

Obtaining containers through blowing special preforms suitably heated within a mould of the desired shape is a technique widely used in the packaging industry, in particular for manufacturing beverage bottles.

Among the various useable techniques, stretch blowing consists in a simultaneous action of mechanical stretch performed by a spindle which moves longitudinally within the preform and blowing by introducing air at high pressure. This technique has several advantages, including improvement of resistance against traction, barrier properties and transparency of the container, as well as the possibility of obtaining containers starting from preforms of lighter weight, with ensuing advantages both from an economic and environmental point of view.

Stretch blowing provides for a pre-blowing, simultaneous to the mechanical stretch action, at a first pressure, and a final blowing at a second pressure.

Known stretch blow moulding machines provide for a double pneumatic system. The first pneumatic system provides air for pre-blowing at constant pressure, settable at values between 2 and 10 bars; the second pneumatic system instead provides blowing air for forming the final bottle and it also operates at constant pressure values, settable between 20 and 40 bars.

This solution is extremely limiting and complex, in that the management of two independent plants complicates the provision of the machine.

Another drawback of the conventional machines lies in the fact that notch pressurization profiles are used, with two different pressures, each at a constant level. Considering the fact that the final mechanical characteristics of a bottle depend on the thermo-forming strategies thereof, having notch deformation profiles could limit the possibility of optimising the bi-orientation phenomenon of the final material, with the ensuing effect that the crystallisation of the material is not optimised.

Last but not least problem lies in the management of the electromechanical inertia of the switching solenoid valves, which offer variability in the opening and closure delay, in turn a function of the variation of performance between one valve and the other; the deterioration of this uncertainty is accentuated by the electro-actuation response times with very wide (30-40 ms) and variable time windows, with the possibility of partly jeopardising the process repeatability.

SUMMARY OF THE INVENTION

The problem targeted by the present invention is to provide a device capable of allowing overcoming one or more of the aforementioned drawbacks.

Such problem is overcome by a pressure adjustment device, as outlined in the attached claims, whose definitions form an integral part of the present description.

Further characteristics and advantages of the present invention shall be more apparent from the description of some embodiments, provided hereinafter by way of non-limiting example.

DETAILED DESCRIPTION OF THE INVENTION

Figure 1:
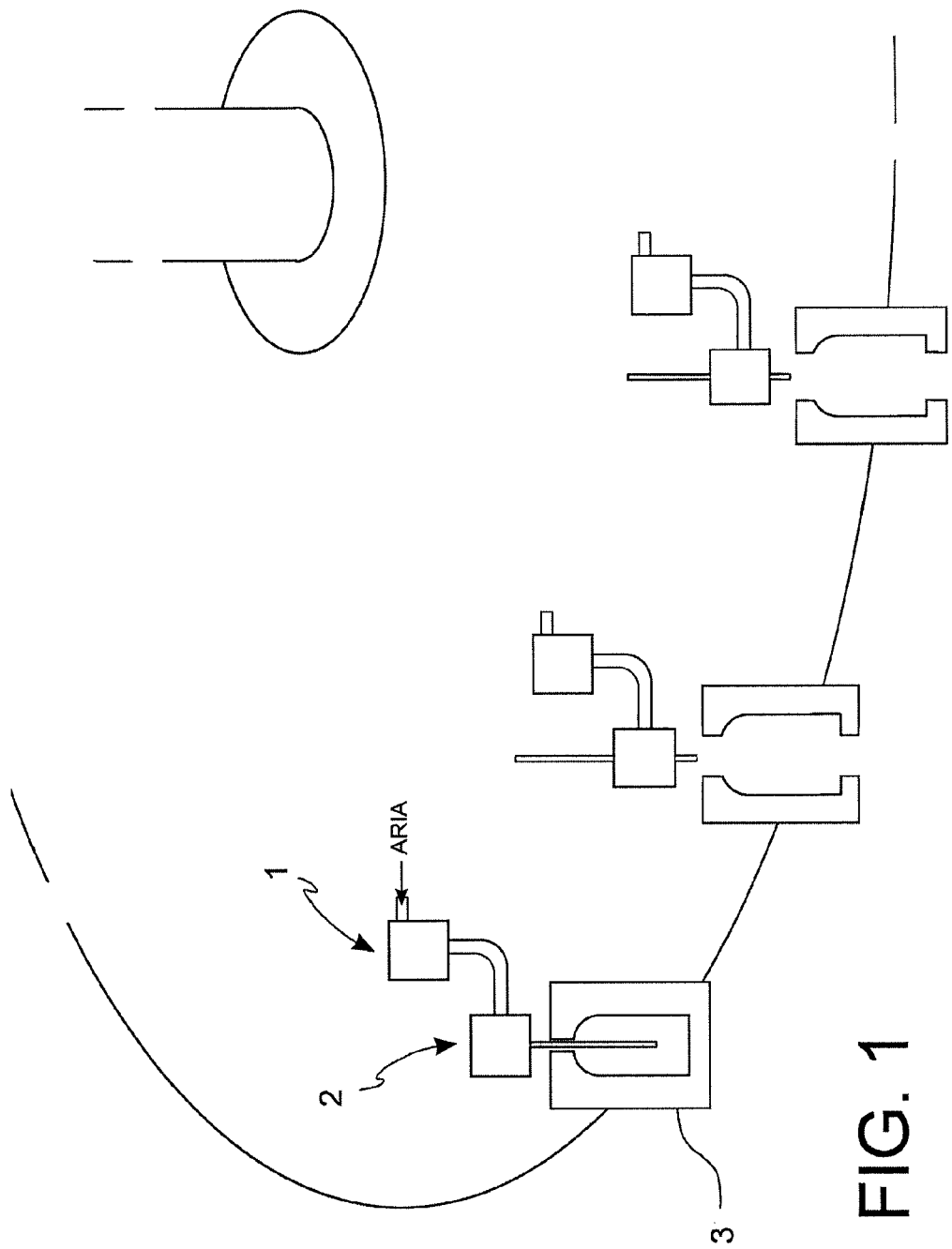
FIG. 1 shows a schematic view of a rotary machine for the stretch blowing of containers which uses the device of the invention.
Figure 2:
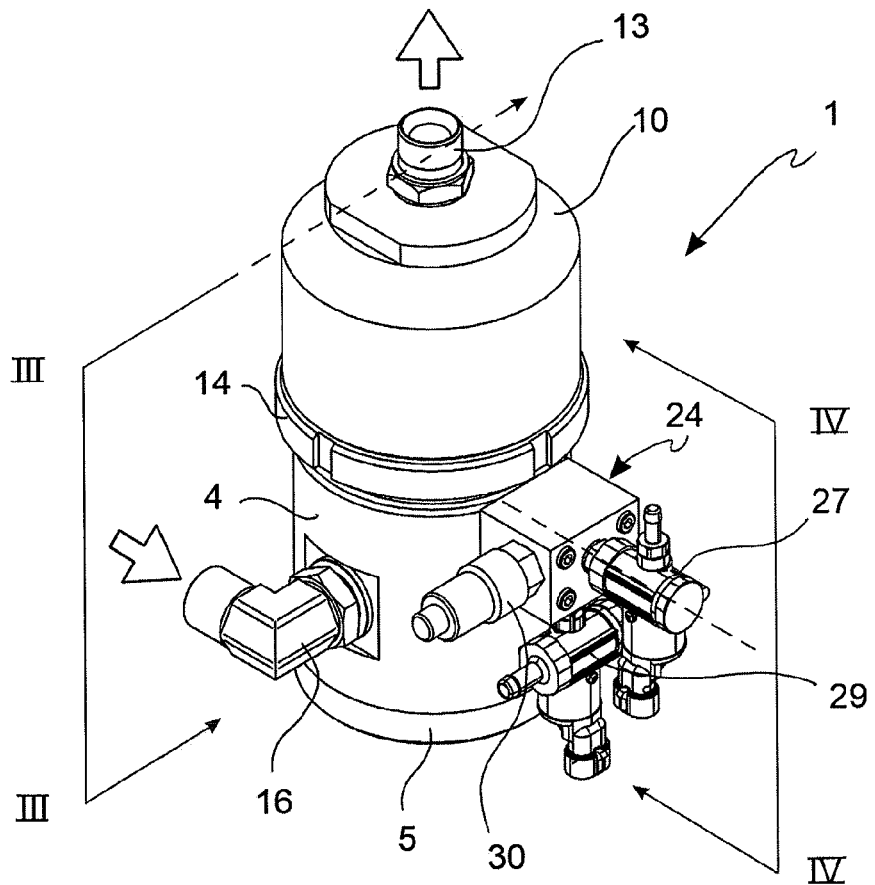
FIG. 2 shows a perspective view of the device of the invention, in an overturned position with respect to the one shown in FIG. 1.

With reference to the figures, the pressure adjustment device of the invention, indicated in its entirety with reference 1, is applicable, according to what is shown in FIG. 1, to a stretch blowing device 2 coupled to a mould 3 for containers, of the conventional type. The entirety can be mounted on linear stretch blow moulding machines or as shown in FIG. 1, on rotary stretch blow moulding machines, on which there will be a plurality of stretch blowing moulding units.

The pressure adjustment device 1 comprises a hollow body 4, typically cylindrical. The hollow body 4 is closed at one end by closing means 5, which in the embodiment shown in the figures are removably fastened (through fixing screws), but which could be made in a single piece with the hollow body 4.

The closing means 5 have a double notch section and they have an outer diameter 5', substantially equivalent to the outer diameter of the hollow body 4, an intermediate diameter 5", substantially equivalent to the inner diameter of the hollow body 4, and an inner diameter 5''' such to create an annular groove 6 between it and the inner wall of the hollow body 4. The notch formed between the outer diameter 5' and the intermediate diameter 5" ends in abutment against the edge of the hollow body 4, while the annular groove 6 houses sealing means 7, typically a gasket. Such gasket is suitable for a sealing of a high pressure fluid.

The closing means 5 are removably fastened to the hollow body 4 through screw fastening means 9.

The sealing means 7 are held in a position by stop means 8, specifically a disc with diameter greater than said inner diameter 5''' and smaller than said intermediate diameter 5", so as to leave an outer portion 7' of said sealing means 7 uncovered. The stop disc is removably fastened to the closing means 5 through screw fastening means 9'.

The end of the hollow body 4 opposite to the closing means 5 is in turn closed by a bell-shaped lid 10, which has a double notch inner profile, identifying a first diameter 10', having greater extension, a second diameter 10" (centring diameter between the hollow body 4 and the bell-shaped lid 10), having intermediate extension, and a third diameter 10''' (centring diameter between the shutter and the bell-shaped lid 10), having smaller extension. The inner surface of the first diameter 10' comprises a threading which is engaged with a corresponding threading on the outer surface of the hollow body 4 and which allows the adjustment of the bell-shaped lid 10 on the hollow body 4 height-wise.

The upper surface 11 of the cover 10 comprises a dispensing opening 12 to which connection means 13 are associated, for the connection for example to suitable connection pipings (not shown) with the stretch-blowing device 2.

A ring nut 14 is used for fixing the bell-shaped lid 10 in the desired position on the hollow body 4.

The hollow body 4 has an inlet opening 15 for the introduction of high pressure air (typically, about 40 bars). To the inlet opening 15 connection means 16 are associated to suitable connection pipings (not shown) with a source of high pressure air.

The inlet opening 15 is positioned in the portion of the hollow body 4 near the sealing means 7. The hollow body 4 comprises a second inlet opening 17, arranged in an axially spaced position with respect to the first inlet opening 15, moving away from the closing means 5. In the embodiment shown in the figures, the second inlet opening 17 is staggered by about 90° with respect to the first opening 15 along the circumference of the hollow body 4 due to overall dimension reasons, but it can be positioned differently.

Such second inlet opening 17 is intended for the introduction of a piloting fluid of the device of the invention, as better described hereinafter.

Between the first inlet opening 15 and the second inlet opening 17, the inner surface of the hollow body 4 has an annular projection 18 having a cylindrical inner surface.

Within the hollow body 4 there is arranged a shutter 20. The shutter 20 slides in the axial direction within the hollow body 4. The shutter 20 is hollow-cylindrical-shaped and has on the outer surface, in an axially spaced position with respect to the annular projection 18 and with respect to the second inlet opening 17 of the hollow body 4, relatively to the closing means 5, an annular projection 21 having a cylindrical outer surface. The outer diameter of the shutter 20 and of the relative annular projection 21 are such that the outer surfaces thereof are slidably engaged with the surface of the annular projection 18 of the hollow body 4 and with the inner surface of the hollow body 4, respectively. For such purpose, the cylindrical inner surface of the annular projection 18 and the inner surface of the hollow body 4, at the annular projection 21 of the shutter 20, have respective sealing means 19, 19', 19''.

Between the annular projection 18 of the hollow body 4 and the annular projection 21 of the shutter 20, at the height of the second inlet opening 17, a piloting chamber 22, annular-shaped in the drawing, is formed, whose function will be apparent in the present description hereinafter.

Elastic means 23, such as a coil spring, are arranged in the space comprised between the annular projection 21 of the shutter 20 and the bell-shaped lid 10 and press on the respective shoulders 21a, 10a.

Between the shutter 20 and the bell-shaped lid 10, at the diameter 10''', there is sealing means $10^{iv}$, intended to separate the pressure passing through the dispensing opening 12 from the chamber for containing the spring 23.

The axial extension of the shutter 20 is smaller than the inner space of the hollow body 4, between the closing means 5 and the bell-shaped lid 10, allowing the axial sliding of the shutter 20 between a closing position, in which the edge of the shutter 20 ends up in abutment against the portion 7' of the sealing means 7 arranged in the annular groove 6, and an adjustable opening position, in which the shutter 20 slides moving away from said sealing means 7 with a self-adjusting travel depending on the flow rate demand.

It should be observed that the elastic means 23 hold the shutter 20 in a closing position and that opening thereof may occur only in contrast with said elastic means 23.

The second inlet opening 17 of the hollow body 4 is in flow communication with pressing piloting means 24. Said pressing piloting means 24 comprise a joining element 25 comprising a pressurization channel 26, aligned with the second inlet opening 17 of the hollow body 4. The channel 26 places the piloting chamber 22 within the hollow body 4 in flow communication with valve-type venting means 27.

The joining element 25 further comprises a joining channel 28, which places the pressurization channel 26 in flow communication with valve-type injection means 29, and pressure detection means 30, such as a pressure probe, which read the pressure within the pressurization channel 26.

The valve-type injection means 29 and venting means 27 are for example injectors for controlling the loading and unloading, respectively, controlled electronically, with very brief response times (for example, about 2 ms), while the pressure probe can have response times <0.5 ms. Thus, the pressure within the chamber 22 can be substantially adjusted in real time.

The valve-type injection means 29 are connected to a source of pressurized air at pressures generally comprised between 1 and 6 bars.

The pressing piloting means 24 are actuated by an actuation and control unit.

The pressure adjustment device according to the invention operates as follows.

The pressure of the air supplied by the device through the dispensing opening 12, at the constancy of the pressure of the air introduced through the first inlet opening 15, depends on the section of the opening that is created between the shutter 20 and the sealing means 7. The adjustment of this opening section, and thus also of the pressure supplied to the opening 12, is obtained by sliding the shutter 20 moving away from the sealing means 7, in contrast with the elastic means 23.

The sliding of the shutter 20 is obtained through the introduction of air at suitable pressure—called "piloting pressure"—within the piloting chamber 22. Knowing the constant load Km of the elastic means 23, it is feasible to accurately determining the piloting pressure within the chamber so as to slide the shutter 20 opening the air passage, to which there will thus correspond the desired dispensing pressure of the device as a function of the geometric equilibrium of the latter.

As mentioned above, the piloting pressure can be varied in real time by automatically operating on the valve-type injection means 29 and on the valve-type venting means 27 according to the pressure read by the detection means 30.

Fastening or loosening the bell-shaped lid 10 allows obtaining a slight modification of the constant load Km of the elastic means 23. In this way, it is possible for example to align the pressure supplied in case of a plurality of stretch-blowing devices 2—as it normally occurs in linear or rotary machines—overcoming slight geometric differences between one device and the other which could affect the repeatability and homogeneity of the operation.

The small value of the piloting chamber 22 allows extremely brief response times, not exceeding 3 ms.

Thus, as described previously, the supply pressure and thus the stretch blowing pressure which, as mentioned previously, varies between a pre-blow pressure (2-10 bars) and an actual blow pressure (20-40 bars) can be adjusted in an extremely quick and accurate manner.

Figure 5:
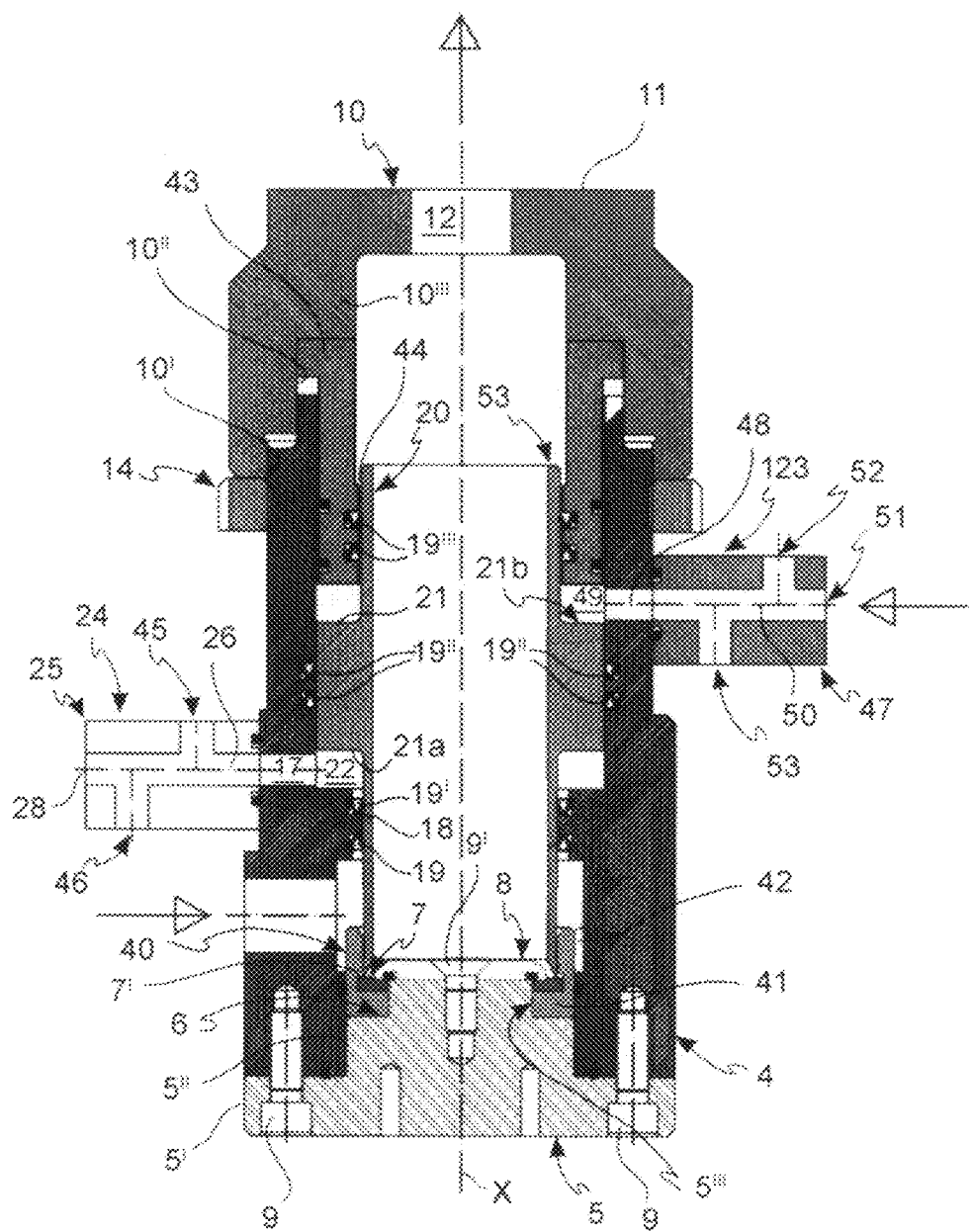
FIG. 5 shows a longitudinally sectioned schematic view of a different embodiment of the device of the invention.

In a different embodiment, schematically shown in FIG. 5 in which the identical parts are indicated with the numbers used for the first embodiment, the pressure adjustment device 1 comprises a hollow body 4, typically cylindrical, which develops along the axis X. The hollow body 4 is closed at one end by closing means 5.

The closing means 5 have a double notch section and they have an outer diameter 5', substantially equivalent to the outer diameter of the hollow body 4, an intermediate diameter 5", substantially equivalent to the inner diameter of the hollow body 4, and an inner diameter 5''' such to create an annular groove 6 between it and the inner wall of the hollow body 4. The notch between the outer diameter 5' and the intermediate diameter 5" ends up in abutment against the edge of the hollow body 4, while the annular groove 6 houses a guide element 40.

The guide element 40 is annular-shaped and has a base portion 41, which is housed in the seat 6, and a cylindrical outer wall 42, which develops along the axis X starting from the base portion 41 for a height greater than that of the seat 6.

Between the base portion 41 and the cylindrical outer wall 42 an L-shaped seat is formed in which the sealing means 7, typically a gasket, are arranged. Such gasket is suitable for sealing a high pressure fluid.

The closing means 5 are removably fastened to the hollow body 4 through screw fastening means 9.

The sealing means 7 are held in position by stop means 8, specifically a disc having a diameter greater than said inner diameter 5''' and smaller than said intermediate diameter 5", so as to leave an outer portion 7' of said sealing means 7 uncovered. The stop disc is removably fastened to the closing means 5 through screw fastening means 9'.

At the end of the hollow body 4 opposite to the closing means 5 a sealing flange 43 is associated. The sealing flange 43 has—on the inner surface thereof—an annular projection 44 having a cylindrical inner surface.

The upper end of the device is in turn closed by a bell-shaped lid 10, which has a double notch inner profile, identifying a first diameter 10', having greater extension, a second diameter 10" (centring diameter between the hollow body 4/sealing flange 43 and the bell-shaped lid 10), having intermediate extension, and a third diameter 10''', having smaller extension, substantially corresponding to the inner diameter of the sealing flange 43. The inner surface of the first diameter 10' comprises fastening means, such as for example a threading which is engaged with a corresponding threading on the outer surface of the hollow body 4.

The upper surface 11 of the cover 10 comprises a dispensing opening 12 to which connection means (not shown) are associated for connection for example to suitable connection pipings with the stretch-blowing device 2.

A ring nut 14 is used for fastening the bell-shaped lid 10 on the hollow body 4.

The ring nut 14 can also vary the positioning of the lid 10 and hence adjust the maximum opening of the valve and consequently the maximum load.

Figure 3:
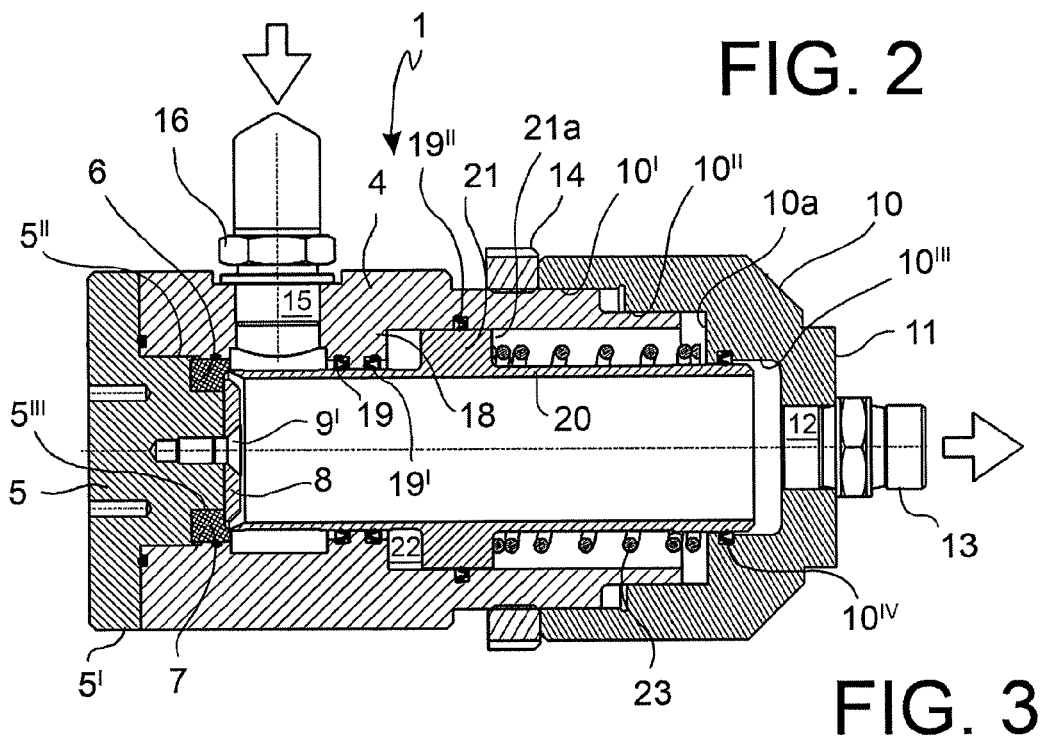
FIG. 3 shows a view of the device of the invention according to section III-III of FIG. 2.
Figure 4:
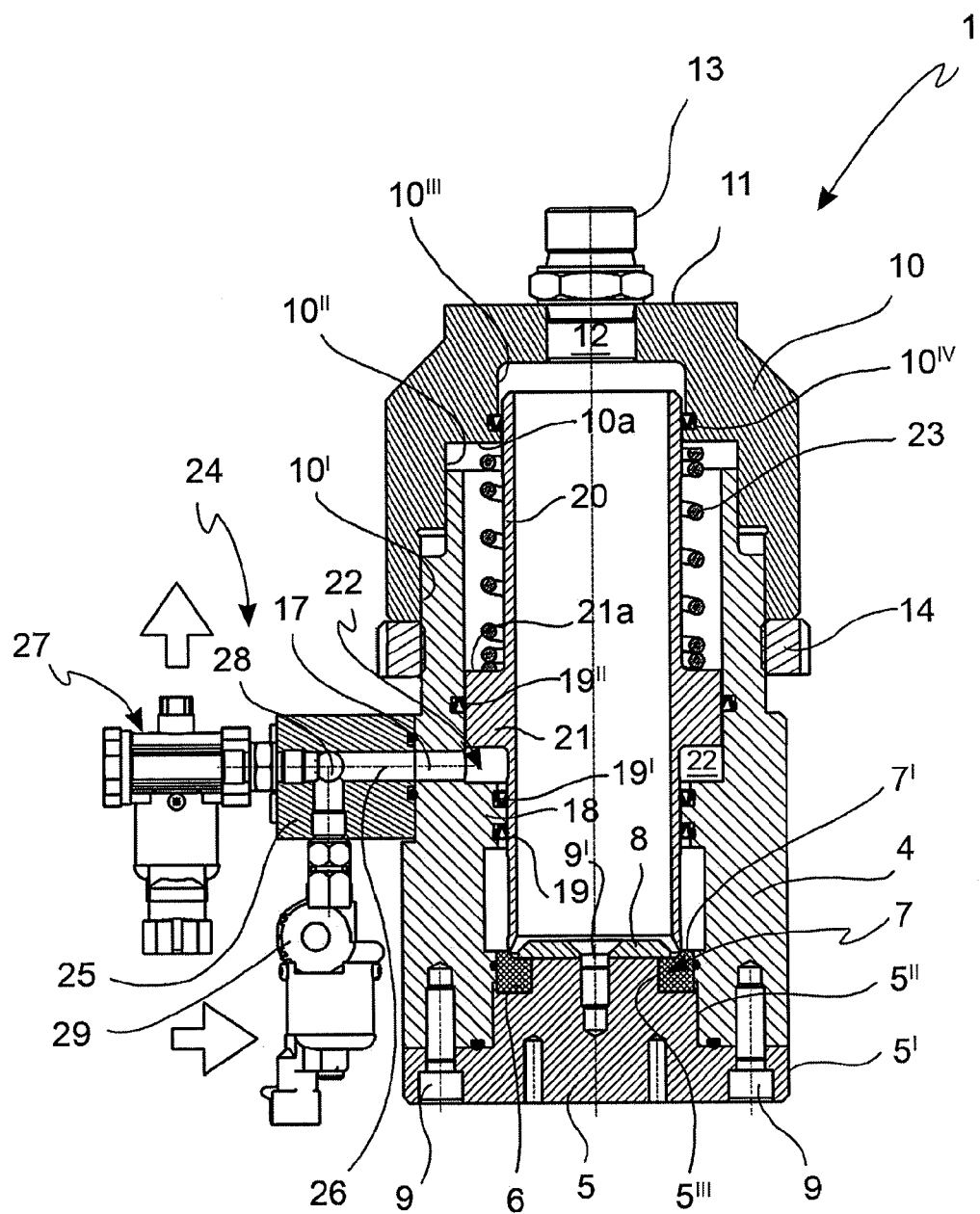
FIG. 4 shows a view of the device of the invention according to section IV-IV of FIG. 2.

The hollow body 4 has an inlet opening (not shown, but entirely analogous to that of FIG. 3 in the first embodiment) for the introduction of high pressure air (typically, at about 40 bars). At the inlet opening, connection means will be associated to suitable connection pipings (not shown) with a source of high pressure air. The inlet opening is positioned in the portion of the hollow body 4 near the sealing means 7.

The hollow body 4 comprises a second inlet opening 17, arranged in a position axially spaced apart with respect to the first inlet opening, moving away from the closing means 5.

Such second inlet opening 17 is intended for the introduction of a piloting fluid of the device of the invention, as better described hereinafter.

Between the first inlet opening and the second inlet opening 17, the inner surface of the hollow body 4 has an annular projection 18 having a cylindrical inner surface.

Within the hollow body 4 a shutter 20 is arranged. The shutter 20 is slidable in the axial direction within the hollow body 4. The shutter 20 is hollow-cylindrical-shaped and has—on the outer surface in an axially spaced position both with respect to the annular projection 18 and with respect to the second inlet opening 17 of the hollow body 4 and intermediate between the annular projection 18 of the hollow body 4 and the annular projection 44 of the sealing flange 43—an annular projection 21 having a cylindrical outer surface. The outer diameter of the shutter 20 and of the relative annular projection 21 are such that the outer surfaces thereof are slidably engaged with the surface of the annular projection 18 of the hollow body 4 and of the annular projection 44 of the sealing flange 43 and with the inner surface of the hollow body 4, respectively. For such purpose, the cylindrical inner surface of the annular projection 18 and of the annular projection 44 and the inner surface of the hollow body 4, both at the annular projection 21 and above as well as beneath it, have respective sealing means 19, 19', 19", 19'''.

The annular projection 21 comprises an upper surface 21*b* and a lower surface 21*a*.

In operating conditions, the lower surface 21*a* of the annular projection 21 is positioned at the upper part with respect to the second inlet opening 17.

The shutter 20 further comprises an upper edge 53 having a substantially flat surface.

Between the annular projection 18 of the hollow body 4 and the annular projection 21 of the shutter 20, at the height of the second inlet opening 17, a piloting chamber 22, annular-shaped in the drawing, is formed whose function will be apparent in the present description hereinafter.

The axial extension of the shutter 20 is lesser than the inner space of the hollow body 4, between the closing means 5 and the bell-shaped lid 10, allowing the axial sliding of the shutter 20 between a closing position, in which the edge of the shutter 20 abuts against the portion 7' of the sealing means 7 arranged in the annular groove 6, and an adjustable opening position, in which the shutter 20 slides moving away from said sealing means 7 with a self-adapting travel depending on the flow rate demand.

For such purpose, the device of the invention comprises elastic means 123 which counter the opening of the shutter 20.

In the embodiment of FIG. 5, the elastic means 123 are of the pneumatic type and comprise a collector 47 positioned at a third inlet opening 48 for a high pressure fluid, made in the hollow body 4. Such inlet opening 48 is arranged above the upper surface 21*b* of the annular projection 21 of the shutter 20 and beneath the annular projection 44 of the sealing flange 43, so that between such surfaces, within the hollow body 4, a counterpressure chamber 49 is created.

The collector 47 comprises a pressurization channel 50 arranged aligned with the inlet opening 48 and terminating at the opposite end with a pressurization opening 51, connected with pressurization means (not shown).

The pressurization means are connected to electronically-controlled injectors and are operated by an actuation and control unit.

From the pressurization channel a venting channel 52 derives, connected with valve-type venting means (not shown) and an auxiliary channel 53, connected with pressure detection means (not shown).

Also the valve-type venting means and the pressure detection means are controlled by said actuation and control unit.

The second inlet opening 17 of the hollow body 4 is in flow communication with pressing piloting means 24. Said pressing piloting means 24 comprise a joining element 25 comprising a pressure channel 26, aligned with the second inlet opening 17 of the hollow body 4. The channel 26 places the piloting chamber 22 within the hollow body 4 in flow communication with pressurization means (not shown) connected to the pressurization opening 28 of the joining element 25.

The joining element 25 further comprises a joining channel 46, which places the pressurization channel 26 in flow communication with valve-type venting means (not shown), and an auxiliary channel 45 connected to pressure detection means (not shown) which read the pressure within the pressurization channel 26.

The pressure detection means described above can for example be a pressure probe.

The injection and venting valve-type means are for example injectors for controlling loading and unloading, respectively, actuated electronically, with extremely brief response times (for example, about 2 ms), while the pressure probe may have response times<0.5 ms. In this manner, the pressure within the chamber 22 may be substantially adjusted in real time.

The pressurization means are typically a source of pressurized air at pressure generally comprised between 1 and 6 bars.

The pressing piloting means 24 and the pneumatic elastic means 123 are controlled by the same actuation and control unit.

The pressure adjustment device according to the invention operates as follows.

The pressure of the air dispensed by the device through the dispensing opening 12, at the constancy of the pressure of the air introduced through the first inlet opening, depends on the opening section that is created between the shutter 20 and the sealing means 7. The adjustment of this opening section, and thus also of the pressure dispensed to the opening 12, is obtained by sliding the shutter 20 moving away from the sealing means 7, in contrast with the pneumatic elastic means 123.

The sliding of the shutter 20 is obtained by introducing air at a suitable pressure—called "piloting pressure"—within the piloting chamber 22. The pressurized air introduced into the counterpressure chamber 49 instead tends to hold the shutter 20 closed. The equilibrium position of the shutter 20, to which the desired dispensing pressure of the device thus corresponds as a function of the geometric equilibriums of the latter, may be adjusted by varying the pressure within the counterpressure chamber 49.

In this way it is possible for example to align the dispensed pressure in case of a plurality of stretch-blowing devices 2—as it normally occurs in linear or rotary machines—overcoming slight geometric differences between one device and the other which could affect the repeatability and the homogeneity of the operation.

As mentioned above, the piloting pressure could be varied in real time operating automatically on the valve-type injection means and on the valve-type venting means according to the pressure read by the detection means.

The small volume of the piloting chamber 22 allows extremely brief response times, not exceeding 3 ms.

Analogously, the counterpressure exerted by the pneumatic elastic means 123 can be adjusted in real time.

Thus, as described previously, the dispensing pressure and thus the stretch blowing pressure which, as mentioned previously, varies between a pre-blowing pressure (2-10 bars) and an actual blow pressure (20-40 bars) can be adjusted in an extremely quick and accurate manner.

In this way, it is possible to adjust the pressurization curve between 0 and 40 bars, without stopping the operation of the device.

Thus, the device of the invention, contrary to the devices of the prior art, allows avoiding sudden pressure surge between pre-blowing and blowing, in that the device of the invention allows gradually adjusting the pressure by intervening on the piloting pressure.

Furthermore, both steps allow designing a pressure profile capable of adapting to the particular geometry of the container to be blown—which for example may have one or more narrowings in some portions of the body thereof—maintaining a suitable stretch level and a correct bi-orientation of the material of the container.

In the description above only air has been mentioned as the blowing fluid, but it is clear that, depending on the contingent needs, a different inert fluid can be used. Also regarding the determination of the piloting pressure in the piloting chamber 22 a gaseous fluid different from air can be used.

The use of a gaseous fluid for determining the piloting pressure is essential in that, due to the compressibility thereof, a self-adjustment of the pressure supplied upon the variation of the flow rates can be obtained, due to the pressure equilibrium that is established between the annular chamber 22 and the upper section of the shutter 20 (upper edge 53).

Thus, a further object of the invention is constituted by a stretch blow moulding method comprising:

a) providing a stretch blow moulding machine equipped with one or more moulds 3 and one or more stretch-blowers 2 and adjustment of the pressure 1 according to the invention;

b) introducing into each of the moulds 3 a heated □erform exceeding the glass transition temperature of the material it is made of;

c) implementing an operation for stretch blowing a container from said □erform in said mould 3, in which said stretch blowing operation comprises, besides the axial stretch determined by a mechanical spindle, the introduction of a blowing fluid within said mould 3 according to a predefined pressure gradient in which the pressure can be adjusted continuously;

d) holding the container in the mould 3 up to the formation thereof and extracting the formed container from said mould 3.

It is clear that only a few embodiments of the present invention have been described, which will be subjected—by a man skilled in the art—to all modifications required for adaptation thereof to particular applications without departing from the scope of protection of the present invention.

Actually, it should be observed that the pressure adjustment device according to the invention, due to the possibility of defining a particular pressurization gradient, can also be used in machines that do not provide for the use of a stretch-blowing device 2, but which imply the use of a device for the introduction of high pressure air in absence of a mechanical stretch action (due to the presence, in the known stretch blow machines, of a stretch rod), simultaneously maintaining the advantages of a conventional stretch blowing, in terms of bi-orientation and crystallinity of the material.

Furthermore, the device of the invention may be used in all applications which require an adjustment and modulation of the dispensed pressure.

I claim:

1. Pressure adjustment device, in particular for stretch blow moulding machines of containers made of plastic material, comprising an opening for dispensing a blowing fluid, said device comprising a hollow body having a first inlet opening for a high pressure fluid and a second inlet opening for a piloting fluid, within said hollow body being slidably arranged a shutter, said shutter being held in closing position by elastic means, wherein the adjustable opening of said shutter occurs, in contrast with said elastic means, by introducing—through said second inlet opening said piloting fluid into a piloting chamber arranged between said hollow body and said shutter, and wherein said piloting fluid has a controlled and adjustable pressure, wherein said hollow body is closed at one end by closing means and at the opposite end by a bell-shaped lid, wherein said closing means are removable and comprise an outer diameter, substantially equivalent to the outer diameter of the hollow body, an intermediate diameter, substantially equivalent to the inner diameter of the hollow body, and an inner diameter such to create an annular groove between it and the inner wall of the hollow body, said annular groove having a sealing means disposed therein, on which said shutter presses when it is in closing position.

2. Device according to claim 1, wherein said shutter is hollow-cylindrical-shaped and comprises an annular projection slidably engaged with the inner surface of said hollow body, wherein said elastic means press against a shoulder of said annular projection.

3. Device according to claim 1, wherein the inner surface of said hollow body comprises an annular projection, with which the shutter is slidably engaged, between said annular projection of the hollow body and said annular projection of said shutter being formed said piloting chamber.

4. Device according to claim 1, wherein said bell-shaped lid comprises said dispensing opening and it adjustable height-wise with respect to the hollow body, so as to vary the constant load (Km) of the elastic means.

5. Device according to claim 1, wherein said second inlet opening of the hollow body is in flow communication with pressing piloting means which comprise a joining element having a pressurization channel, aligned with the second inlet opening, and a joining channel which places the piloting chamber in flow communication with valve means for injecting a pressurised piloting fluid.

6. Device according to claim 5, wherein said joining element comprises valve-type venting means and pressure detection means which read the pressure within the pressurization channel.

7. Device according to claim 6, wherein said injection and venting valve-type means are electronically controlled injectors and wherein said pressing piloting means are controlled by an actuation and control unit.

8. Device according to claim 1, wherein the inner surface of said annular projection of the hollow body and the inner surface of said hollow body, at the annular projection of the shutter and at the third diameter, comprise respective sealing means.

9. Device according to claim 1, wherein said piloting fluid is a gas and it is preferably at a pressure comprised between 1 and 6 bars.

10. Device according to claim 1, wherein said elastic means are a coil spring.

11. Device according to claim 1, wherein said elastic means are pneumatic elastic means.

12. Device according to claim 11, wherein said elastic means comprise a collector positioned at a third inlet opening of the hollow body for a high pressure fluid, which terminates in a counterpressure chamber within the hollow body.

13. Device according to claim 12, wherein said collector comprises a pressurization channel arranged aligned with the inlet opening and terminating at the opposite end with a pressurization opening, connected with pressurization means, wherein from said pressurization channel a venting channel derives, connected with valve-type venting means, and an auxiliary channel, connected with pressure detection means.

14. Device according to claim 12, wherein said counterpressure chamber is arranged in a position axially higher with respect to the annular projection of the shutter.

15. Device according to claim 13, wherein the pressurization means and the valve-type venting means are connected to electronically-controlled injectors and are controlled, together with said pressure detection means, by said actuation and control unit.

16. Stretch blow moulding machine, of the linear or rotary type, of containers made of plastic material, comprising a plurality of moulds, each of said moulds being operatively coupled to a stretch-blowing device, wherein said stretch-blowing device is connected to a source of a pressurised fluid through a pressure adjustment device as defined in claim 1.

* * * * *